(12) United States Patent
Toosi et al.

(10) Patent No.: US 9,228,099 B2
(45) Date of Patent: Jan. 5, 2016

(54) PHASE CHANGE INK COMPOSITION AND PROCESS FOR PREPARING SAME

(71) Applicant: Xerox Corporation, Norwalk, CT (US)

(72) Inventors: Salma Falah Toosi, Mississauga (CA); Mihaela Maria Birau, Mississauga (CA); Biby Esther Abraham, Mississauga (CA); Gabriel Iftime, Mississauga (CA); James D. Mayo, Mississauga (CA); C. Geoffrey Allen, Waterdown (CA)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 13/723,909

(22) Filed: Dec. 21, 2012

(65) Prior Publication Data

US 2014/0176652 A1 Jun. 26, 2014

(51) Int. Cl.
*C09D 11/00* (2014.01)
*C09D 11/322* (2014.01)
(Continued)

(52) U.S. Cl.
CPC ............ *C09D 11/322* (2013.01); *B41J 2/2114* (2013.01); *B41M 3/14* (2013.01); *C09D 11/12* (2013.01); *C09D 11/34* (2013.01); *C09D 11/38* (2013.01); *C09D 11/50* (2013.01)

(58) Field of Classification Search
CPC ........ B41J 2/01; B41J 2/17593; B41J 2/2107; B41J 2/2114; C09D 11/005; C09D 11/32; C09D 11/322; C09D 11/34; C09D 11/36; C09D 11/40; C09D 11/54; C09D 11/12; C09D 11/38; C09D 11/50; B41M 3/14
USPC ........ 347/88, 99, 100, 102; 106/31.61–31.63, 106/31.65, 31.85, 31.97
See application file for complete search history.

(56) References Cited

U.S. PATENT DOCUMENTS

| 4,390,369 A | 6/1983 | Merritt et al. |
| 4,484,948 A | 11/1984 | Merritt et al. |

(Continued)

FOREIGN PATENT DOCUMENTS

| EP | 0187352 | 7/1986 |
| EP | 0206286 | 12/1986 |
| WO | WO 94/04619 | 3/1994 |

OTHER PUBLICATIONS

Peter Lucon, et al., Abstract, "Low-Frequency Acoustic Mixing of Complex and Multiphase systems," North American Mixing Forum, Mixing XXII, Jun. 20-25, 2010, Victoria, BC, Canada, 1 page.

(Continued)

*Primary Examiner* — Matthew Luu
*Assistant Examiner* — Rut Patel
(74) *Attorney, Agent, or Firm* — Marylou J. Lavoie, Esq. LLC (57) ABSTRACT

A process for preparing a phase change ink including (a) subjecting a white colorant to acoustic mixing at an acceleration of from about 30 to about 110 g; (b) optionally, adding a dispersant and subjecting the white colorant and dispersant to further acoustic mixing at an acceleration of from about 30 to about 110 g; (c) separately melt mixing an optional antioxidant, an optional synergist, and a phase change ink carrier comprising (i) a branched triamide and (ii) a polyethylene wax, a Fischer Tropsch wax, or a mixture or combination thereof, to form a melt mixture; (d) adding the melt mixture of (c) to the acoustically mixed white colorant of (a) or (b) with stirring; (e) optionally, adding a fluorescent dye with stirring; and (d) optionally, filtering the phase change ink.

20 Claims, 2 Drawing Sheets (51) Int. Cl.
*B41J 2/21* (2006.01)
*B41M 3/14* (2006.01)
*C09D 11/12* (2006.01)
*C09D 11/34* (2014.01)
*C09D 11/38* (2014.01)
*C09D 11/50* (2014.01)

(56) References Cited

U.S. PATENT DOCUMENTS

| | | |
|---|---|---|
| 4,684,956 A | 8/1987 | Ball |
| 4,830,671 A | 5/1989 | Frihart et al. |
| 4,851,045 A | 7/1989 | Taniguchi |
| 4,889,560 A | 12/1989 | Jaeger et al. |
| 4,889,761 A | 12/1989 | Titterington et al. |
| 5,006,170 A | 4/1991 | Schwarz et al. |
| 5,151,120 A | 9/1992 | You et al. |
| 5,194,638 A | 3/1993 | Frihart et al. |
| 5,195,430 A | 3/1993 | Rise |
| 5,221,335 A | 6/1993 | Williams et al. |
| 5,372,852 A | 12/1994 | Titterington et al. |
| 5,389,958 A | 2/1995 | Bui et al. |
| 5,496,879 A | 3/1996 | Griebel et al. |
| 5,597,856 A | 1/1997 | Yu et al. |
| 5,621,022 A | 4/1997 | Jaeger et al. |
| 5,750,604 A | 5/1998 | Banning et al. |
| 5,780,528 A | 7/1998 | Titterington et al. |
| 5,782,966 A | 7/1998 | Bui et al. |
| 5,783,658 A | 7/1998 | Banning et al. |
| 5,827,198 A | 10/1998 | Kassal |
| 5,830,942 A | 11/1998 | King et al. |
| 5,875,631 A | 3/1999 | Smith |
| 5,919,839 A | 7/1999 | Titterington et al. |
| 6,174,937 B1 | 1/2001 | Banning et al. |
| 6,255,432 B1 | 7/2001 | Evans et al. |
| 6,309,453 B1 | 10/2001 | Banning et al. |
| 6,517,619 B1 * | 2/2003 | Nowak et al. ............ 106/31.32 |
| 6,547,380 B2 | 4/2003 | Smith et al. |
| 6,719,449 B1 | 4/2004 | Laugharn et al. |
| 6,795,228 B2 | 9/2004 | Sacripante et al. |
| 6,860,930 B2 | 3/2005 | Wu et al. |
| 6,948,843 B2 | 9/2005 | Laugharn et al. |
| 7,255,895 B2 | 8/2007 | Banerjee et al. |
| 7,329,039 B2 | 2/2008 | Laugharn et al. |
| 7,381,254 B2 | 6/2008 | Wu et al. |
| 7,407,539 B2 | 8/2008 | Wu et al. |
| 7,521,023 B2 | 4/2009 | Laugharn et al. |
| 7,658,486 B2 | 2/2010 | Snyder et al. |
| 7,686,500 B2 | 3/2010 | Laugharn et al. |
| 7,687,026 B2 | 3/2010 | Laugharn et al. |
| 7,687,039 B2 | 3/2010 | Laugharn et al. |
| 7,757,561 B2 | 7/2010 | Laugharn et al. |
| 7,811,525 B2 | 10/2010 | Laugharn et al. |
| 7,857,900 B2 | 12/2010 | Kazmaier et al. |
| 7,955,429 B2 | 6/2011 | Pozarnsky |
| 7,973,186 B1 | 7/2011 | Goredema et al. |
| 7,981,368 B2 | 7/2011 | Laugharn et al. |
| 8,096,649 B2 | 1/2012 | Sambhy et al. |
| 8,124,309 B2 | 2/2012 | Lai et al. |
| 8,143,318 B2 | 3/2012 | Wenzel et al. |
| 8,163,074 B2 | 4/2012 | Banning |
| 8,206,024 B2 | 6/2012 | Wenzel et al. |
| 8,226,207 B2 | 7/2012 | Kovacs et al. |
| 8,226,599 B2 | 7/2012 | Engle |
| 8,268,399 B2 | 9/2012 | Gervasi et al. |
| 8,292,404 B2 | 10/2012 | Zhao et al. |
| 8,506,051 B2 | 8/2013 | Gulvin et al. |
| 8,534,797 B2 | 9/2013 | Zhao et al. |
| 2005/0130054 A1 | 6/2005 | Yuan et al. |
| 2006/0257495 A1 | 11/2006 | Yang et al. |
| 2007/0120927 A1 | 5/2007 | Snyder et al. |
| 2009/0038506 A1 * | 2/2009 | Odell et al. ............ 106/31.13 |
| 2010/0040829 A1 | 2/2010 | Lin et al. |
| 2011/0146537 A1 * | 6/2011 | Goredema et al. ............ 106/311 |
| 2011/0151123 A1 * | 6/2011 | Goredema et al. ............ 427/256 |
| 2012/0092416 A1 | 4/2012 | Platt et al. |

OTHER PUBLICATIONS

English Abstract for German Patent Publication DE 4205636AL, Aug. 26, 1993, Griebel et al, 1 page.

English Abstract for German Patent Publication DE 4205713AL, Aug. 26, 1993, Griebel et al, 1 page.

\* cited by examiner

PHASE CHANGE INK COMPOSITION AND PROCESS FOR PREPARING SAME

BACKGROUND

The present disclosure is generally related to phase change ink, particularly processes for preparing a phase change ink including (a) subjecting a white colorant to acoustic mixing at an acceleration of from about 30 to about 110 g, wherein g is the acceleration of gravity; (b) optionally, adding a dispersant and subjecting the white colorant and dispersant to further acoustic mixing at an acceleration of from about 30 to about 110 g; (c) separately melt mixing an optional antioxidant, an optional synergist, and a phase change ink carrier comprising (i) a branched triamide and (ii) a polyethylene wax, a Fischer Tropsch wax, or a mixture or combination thereof, to form a melt mixture; (d) adding the melt mixture of (c) to the acoustically mixed white colorant of (a) or (b) with stiffing; (e) optionally, adding a fluorescent dye with stiffing; and (d) optionally, filtering the phase change ink.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Hot melt inks typically used with ink jet printers have a wax based ink vehicle, e.g., a crystalline wax. Such solid ink jet inks provide vivid color images. In typical systems, these crystalline wax inks partially cool on an intermediate transfer member and are then pressed into the image receiving medium such as paper. Transfuse spreads the image droplet, providing a richer color and lower pile height. The low flow of the solid ink also prevents showthrough on the paper.

In these systems, the crystalline wax inks are jetted onto a transfer member, for example, an aluminum drum, at temperatures of approximately 100° C. to about 130° C. The wax based inks are heated to such high temperatures to decrease their viscosity for efficient and proper jetting onto the transfer member. The transfer member is at approximately 60° C., so that the wax will cool sufficiently to solidify or crystallize. As the transfer member rolls over the recording medium, e.g., paper, the image comprised of wax based ink is pressed into the paper.

White inks are highly desired for certain graphic and labeling applications. They are most typically used on transparent and dark substrates to compliment or provide a background to text or graphics. White text on smoke colored plastic is particularly striking. White colorants are pigments, which can comprise a variety of materials, most typically titanium dioxide. A general description of titanium dioxide properties can be found, for example, in Kirk-Othmer Encyclopedia of Chemical Technology, $4^{th}$ Ed., (John Wiley & Sons, NY), Vol. 24, pages 239-240, which is hereby incorporated by reference herein. Because white is produced by light scattering, a pigment having a volume average particle size of from about 200 to about 300 nanometers is generally selected to provide sufficient opacity. As the particle size in a dispersion decreases below this range, the dispersion selectively scatters blue light and appears bluish white. As the particle size decreases further, it will not scatter visible light and will become transparent. For example, smaller nanometer sized titanium dioxide pigments are known, but they are colorless. A combination of dense dispersions, for example, from about 2 to about 4 grams of pigment per milliliter of pigment and dispersion, relatively large size, and high loadings of pigment make it particularly challenging to design a storage stable and jettable white curable solid ink.

While known compositions and processes are suitable for their intended purposes, a need remains for phase change white inks that are suitable for ink jet printing processes, such as piezoelectric ink jet processes and the like. In addition, a need remains for phase change white inks that are suitable for acoustic ink jet printing processes. Further, a need remains for improved digital ink jet phase change white inks that can provide excellent print quality on colored package substrates including colored cardboard or thick paper, particularly brown or other darker colors, that can provide the desirable esthetic appearance and appeal of white prints over dark substrates, that provide improved storage stability and low Newtonian viscosity.

The appropriate components and process aspects of the each of the foregoing U.S. patents and patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a process for preparing a phase change ink comprising (a) subjecting a white colorant to acoustic mixing at an acceleration of from about 30 to about 110 g; (b) optionally, adding a dispersant and subjecting the white colorant and dispersant to further acoustic mixing at an acceleration of from about 30 to about 110 g; (c) separately melt mixing an optional antioxidant, an optional synergist, and a phase change ink carrier comprising (i) a branched triamide and (ii) a polyethylene wax, a Fischer Tropsch wax, or a mixture or combination thereof, to form a melt mixture; (d) adding the melt mixture of (c) to the acoustically mixed white colorant of (a) or (b) with stirring; (e) optionally, adding a fluorescent dye with stirring; and (d) optionally, filtering the phase change ink.

Also described is a phase change ink comprising an acoustically treated white colorant; wherein the white colorant has been subjected to acoustic mixing at an acceleration of from about 30 to about 110 g; a colorant dispersant, wherein the colorant dispersant has optionally been subjected to acoustic mixing at an acceleration of from about 30 to about 110 g; an optional synergist; an optional fluorescent dye; and a phase change ink carrier comprising (i) a branched triamide and (ii) a polyethylene wax, a Fischer Tropsch wax, or a mixture or combination thereof.

Also described is a process comprising (1) incorporating into an ink jet printing apparatus a phase change ink composition comprising an acoustically treated white colorant; wherein the white colorant has been subjected to acoustic mixing at an acceleration of from about 30 to about 110 g; a colorant dispersant, wherein the colorant dispersant has optionally been subjected to acoustic mixing at an acceleration of from about 30 to about 110 g; an optional synergist; an optional fluorescent dye; and a phase change ink carrier comprising (i) a branched triamide and (ii) a polyethylene wax, a Fischer Tropsch wax, or a mixture or combination thereof; (2) melting the ink; and (3) causing droplets of the melted ink to be ejected in an imagewise pattern onto a substrate.

Also described is an ink jet printer stick or pellet containing a phase change ink composition comprising an acoustically treated white colorant; wherein the white colorant has been subjected to acoustic mixing at an acceleration of from about 30 to about 110 g; a colorant dispersant, wherein the colorant dispersant has optionally been subjected to acoustic mixing at an acceleration of from about 30 to about 110 g; an optional synergist; an optional fluorescent dye; and a phase change ink carrier comprising (i) a branched triamide and (ii) a polyethylene wax, a Fischer Tropsch wax, or a mixture or combination thereof.

Further described is a coated substrate comprising a substrate and a phase change ink composition deposited thereover; wherein the phase change ink composition comprises an acoustically treated white colorant; wherein the white colorant has been subjected to acoustic mixing at an acceleration of from about 30 to about 110 g; a colorant dispersant, wherein the colorant dispersant has optionally been subjected to acoustic mixing at an acceleration of from about 30 to about 110 g; an optional synergist; a fluorescent dye; and a phase change ink carrier comprising (i) a branched triamide and (ii) a polyethylene wax, a Fischer Tropsch wax, or a mixture or combination thereof.

Further described is a security enabled phase change ink composition comprising an invisible fluorescent dye; an acoustically treated white colorant; wherein the white colorant has been subjected to acoustic mixing at an acceleration of from about 30 to about 110 g; an optional dispersant; an optional synergist; and a phase change ink carrier comprising (i) a branched triamide and (ii) a polyethylene wax, a Fischer Tropsch wax, or a mixture or combination thereof; wherein a printed image prepared with the phase change ink composition appears white under normal ambient conditions and wherein the printed image changes color when subjected to ultraviolet light.

DETAILED DESCRIPTION

The present disclosure is directed to a process for preparing a phase change ink comprising (a) subjecting a white colorant to acoustic mixing at an acceleration of from about 30 to about 110 g, wherein g is the acceleration of gravity and is defined as approximately 9.81 m²/s; (b) optionally, adding a dispersant and subjecting the white colorant and dispersant to further acoustic mixing at an acceleration of from about 30 to about 110 g; (c) separately melt mixing an optional antioxidant, an optional synergist, and a phase change ink carrier comprising (i) a branched triamide and (ii) a polyethylene wax, a Fischer Tropsch wax, or a mixture or combination thereof, to form a melt mixture; (d) adding the melt mixture of (c) to the acoustically mixed white colorant of (a) or (b) with stiffing; (e) optionally, adding a fluorescent dye with stiffing; and (d) optionally, filtering the phase change ink. In embodiments, it is desirable for the efficient mixing of thick pastes comprising white colorant, in embodiments TiO₂ pigment, that the acceleration of acoustic mixing herein proceed, in at least one acoustic mixing step interval, at an acceleration of from about 30 to about 110 g, or from about 60 to about 108 g, or from about 85 to about 105 g.

Colorant.

Any desired or effective white colorant can be employed in the phase change white ink compositions herein, including dyes, pigments, mixtures thereof, and the like, provided that the colorant can be dissolved or dispersed in the ink vehicle.

In embodiments herein, the white colorant is a white pigment selected from titanium dioxide, zinc oxide, zinc sulfide, calcium carbonate, clay, lithopone (a mixture of barium sulphate and zinc sulfide), or mixtures or combinations thereof. In a specific embodiment, the white colorant is a titanium dioxide pigment. In a more specific embodiment, the white colorant is the form of TiO₂ known as rutile. Commercial grades of TiO₂ are designed with additional artifacts to enhance optical properties such as tint strength and undertone and to promote dispersion stability. The pigment features include size, degree of coating with silica and or alumina, as well as optional organic materials. Illustrative examples of suitable titanium oxide pigments include pigments selected from Ti-Pure® R-108, Ti-Pure® R-104, Ti-Pure® R-103, Ti-Pure® R-102, Ti-Pure® R-700, Ti-Pure® R-706, Ti-Pure® R-760, Ti-Pure® R-900, Ti-Pure® R-960, Ti-Pure® R-3910, available from DuPont Titanium Technologies, Wilmington, Del., 2020®, 2063®, 2090®, 2310®, 2450® available from Kronos Inc., Cranbury, N.J., and Tiona® 595, Tiona® 568, Tiona® RCL-6, Tiona® RCL-9, and Tiona® 696 available from Millennium Inorganic Chemicals, Hunt Valley, Md.

In embodiments, pigments selected herein can have a volume average particle size (diameter) of from about 150 to about 450 nanometers, or from about 200 to about 300 nanometers. In one embodiment, the white colorant is a titanium dioxide pigment having a particle size of from about 200 to about 300 nanometers.

The white colorant is present in the ink in any desired or effective amount, in embodiments the white colorant is present in an amount of from about 1 to about 60 percent by weight based upon the total weight of the ink, or from about 20 to about 40 percent by weight based upon the total weight of the ink. In one embodiment, the white colorant is a titanium dioxide pigment present in the ink in an amount of about 1 to about 60 percent by weight based upon the total weight of the ink, or from about 30 to about 40 percent by weight based upon the total weight of the ink, or from about 10 to about 25 percent based upon the total weight of the ink.

Fluorescent Dye.

In embodiments, a novel solid ink composition for security printing applications is provided. The phase change ink composition comprises an acoustically treated white colorant; wherein the white colorant has been subjected to acoustic mixing at an acceleration of from about 30 to about 110 g, wherein the colorant dispersant has optionally been subjected to acoustic mixing at an acceleration of from about 30 to about 110 g; an optional synergist; a phase change ink carrier comprising (i) a branched triamide and (ii) a polyethylene wax, a Fischer Tropsch wax, or a mixture or combination thereof, and a fluorescent dye. The performance of the phase change ink composition is unique because it has features including: (a) for prints made on colored substrates, the printed information changes color from white to a different color when seen under UV light; (b) for prints made with dark ink onto a white background prepared with the present phase change ink composition, the background changes color from white to a different color when exposed to UV light; and (c) coatings can be made with the present fluorescent white ink composition over a dark substrate onto which information is printed digitally.

The fluorescent dye can be any suitable or desired fluorescent dye. The fluorescent dye is typically a dye which is colorless in normal viewing light, for example in room ambient light or sunlight, and which emits bright light when viewed with ultra-violet (UV) light, although not limited. Examples of fluorescent dyes suitable for use herein include those belonging to the dye families known as rhodamines, fluorescein, coumarins, napthalimides, benzoxanthenes, acridines, azos, coordination complexes of rare earth metal ions, rare earth metallic coordination complexes, mixtures thereof and the like. Various invisible fluorescent dyes are commercially available. Other suitable fluorescent dyes include oil and solvent based dyes like DFSB class, DFPD class, DFSB-K class available from Risk Reactor of Huntington Beach, Calif. Other suppliers of fluorescent materials include Beaver Luminescers from Newton, Mass., and Cleveland Pigment & Color Co. form Akron, Ohio.

Suitable fluorescent dyes include, both colorless and colored dyes under normal viewing conditions and include for example, Basic Yellow 40, Basic Red 1, Basic Violet 11, Basic Violet 10, Basic Violet 16, Acid Yellow 73, Acid Yellow 184, Acid Red 50, Acid Red 52, Solvent Yellow 44, Solvent Yellow 131, Solvent Yellow 85, Solvent Yellow 135, solvent Yellow 43, Solvent Yellow 160, Fluorescent Brightener 61, mixtures thereof and the like. Other suitable fluorescent dyes include oil and solvent based dyes like DFSB class, DFPD class, DFSB-K class available from Risk reactor of Huntington Beach, Calif. Suitable fluorescent pigments include, but are not limited to, those available from Day-Glo Color Corp. of Cleveland, Ohio, such as aurora pink T-11 and GT-11, neon red T-12, rocket red T-13 or GT-13, fire orange T-14 or GT-14N, blaze orange T-15 or GT-15N, arc yellow T-16, saturn yellow T-17N, corona magenta GT-21 and GT-17N, mixtures thereof and the like. Other suitable fluorescent pigments available from Risk Reactor are for example PFC class, like for example PFC-03 which switches from invisible to red when exposed to UV light, PF class like for example PF-09 which switches from invisible to violet when exposed to UV light. Other suppliers of fluorescent materials include Beaver Luminescers from Newton, Mass. and Cleveland Pigment & Color Co. form Akron, Ohio. Non-limiting examples of fluorescent materials include 2-(2-hydroxybenzoxazol), 2,5-diphenyl-oxazole, DFKY-C7 (red emitting fluorescent rare earth metal coordination complex dye), DFSB K427 (emits orange color under ambient light and under exposure to UV light), 2-(2-hydroxyphenylbenzothoazole), and mixtures thereof.

In embodiments the present fluorescent phase change ink compositions include:

(a) limited (low or none) overlapping between the absorption spectra of the ink base and/or pigment on one side and the absorption spectrum of the fluorescent dye. This enables the activating UV light to reach the fluorescent dye dispersed in the ink composition. Otherwise the fluorescent is not activated or the intensity of light is diminished significantly, therefore resulting in poor ink detection performance.

(b) limited (low or none) overlapping between the emission spectra of the ink base/pigment package with the emission of the fluorescent dye.

(c) invisible fluorescent dye, that is, colorless under normal ambient viewing light when the objective is minimal or no change at all in the white color appearance.

In a specific embodiment, a security enabled phase change ink composition herein comprises an invisible fluorescent dye; an acoustically treated white colorant; wherein the white colorant has been subjected to acoustic mixing at an acceleration of from about 30 to about 110 g; an optional dispersant; an optional synergist; and a phase change ink carrier comprising (i) a branched triamide and (ii) a polyethylene wax, a Fischer Tropsch wax, or a mixture or combination thereof; wherein a printed image prepared with the phase change ink composition appears white under normal ambient conditions and wherein the printed image changes color when subjected to ultraviolet light.

Carrier.

The phase change ink compositions herein can comprise any suitable or desired phase change ink vehicle or carrier. In embodiments, the phase change ink carrier comprises (i) a branched triamide and (ii) a polyethylene wax or a Fischer Tropsch wax.

Branched triamides are disclosed in, for example, U.S. Pat. No. 6,860,930, the disclosure of which is totally incorporated herein by reference. By "branched triamide" is meant that the structure of the triamide can be drawn so that each amide group is bonded to an atom or group of atoms contained in a branch other than that of the others, and that each amide group is in a different branch. By "each amide group is in a different branch" is meant that the triamide is not linear; by "linear" is meant a molecule wherein all three amide groups can be drawn as being in the same molecular chain or branch, such as linear triamides of the formulae or the like. For purposes of the present invention, linear triamides include those wherein a line can be drawn through the three amide groups, even if one would ordinarily draw a different line. For example, a compound of the formula is considered a linear compound for purposes of the present invention, because it can also be drawn as follows:

and accordingly would not be considered to be a branched triamide for the purposes of the inks discloses herein. For purposes of the inks disclosed herein, "branched triamines", "branched triacids", "branched monoamino diacids", and "branched diamino monoacids" have similar definitions in that each of the three functional groups named can be drawn as being in a different branch from the other two.

Examples of suitable branched triamides include (but are not limited to) those generated from branched triamines, said branched triamides being of the formula wherein $R_1$ is (i) an alkylene group (including linear, branched, saturated, unsaturated, cyclic, acyclic, substituted, and unsubstituted alkylene groups, and wherein hetero atoms, such as oxygen, nitrogen, sulfur, silicon, phosphorus, boron, and the like either may or may not be present in the alkylene group), having from about 3 to about 200 carbon atoms, (ii) an arylene group (including unsubstituted and substituted arylene groups, and wherein hetero atoms, as described above may optionally be present in the arylene group), having from about 6 to about 200 carbon atoms, (iii) an arylalkylene group (including unsubstituted and substituted arylalkylene groups, wherein the alkyl portion of the arylalkylene group can be linear, branched, saturated, unsaturated, cyclic, and/or acyclic, and wherein hetero atoms, as described above may optionally be present in either or both of the alkyl portion and the aryl portion of the arylalkylene group), having from about 7 to about 200 carbon atoms, such as benzylene or the like, or (iv) an alkylarylene group (including unsubstituted and substituted alkylarylene groups, wherein the alkyl portion of the alkylarylene group can be linear, branched, saturated, unsaturated, cyclic, and/or acyclic, and wherein hetero atoms, as described above may optionally be present in either or both of the alkyl portion and the aryl portion of the alkylarylene group), having from about 7 to about 200 carbon atoms, such as tolylene or the like, Ra, Rb, and Rc each, independently of the others, is (i) a hydrogen atom, (ii) an alkyl group (including linear, branched, saturated, unsaturated, cyclic, acyclic, substituted, and unsubstituted alkyl groups, and wherein hetero atoms, such as described above may optionally be present in the alkyl group), having from 1 carbon atom to about 200 carbon atoms, (iii) an aryl group (including unsubstituted and substituted aryl groups, and wherein hetero atoms, such as described above may optionally be present in the aryl group), having from 6 to about 200 carbon atoms, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as described above may optionally be present in either or both of the alkyl portion and the aryl portion of the arylalkyl group), having from 6 to about 200 carbon atoms, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as described above may optionally be present in either or both of the alkyl portion and the aryl portion of the alkylaryl group), having 6 to about 200 carbon atoms, such as tolyl or the like, Rd, Re, and Rf each, independently of the others, is (i) an alkyl group (including linear, branched, saturated, unsaturated, cyclic, acyclic, substituted, and unsubstituted alkyl groups, and wherein hetero atoms, such as described above may optionally be present in the alkyl group), having 1 to about 200 carbon atoms, (ii) an aryl group (including unsubstituted and substituted aryl groups, and wherein hetero atoms, such as described above may optionally be present in the aryl group), having 6 to about 200 carbon atoms, (iii) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms, such as described above may optionally be present in either or both of the alkyl portion and the aryl portion of the arylalkyl group), having 6 to about 200 carbon atoms, such as benzyl or the like, or (iv) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms, such as described above may optionally be present in either or both of the alkyl portion and the aryl portion of the alkylaryl group), having 6 to about 200 carbon atoms, such as tolyl or the like, those generated from branched triacids, said branched triamides being of the formula wherein $R_2$ is (i) an alkylene group as described for $R_1$ above, Rg, Rj, and Rp each, independently of the others, is (i) a hydrogen atom, (ii) an alkyl group (including linear, branched, saturated, unsaturated, cyclic, acyclic, substituted, and unsubstituted alkyl groups, and wherein hetero atoms may optionally be present in the alkyl group), having 1 to about 200 carbon atoms, (iii) an aryl group (including unsubstituted and substituted aryl groups, and wherein hetero atoms may optionally be present in the aryl group), having 10 to about 200 carbon atoms, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms may optionally be present in either or both of the alkyl portion and the aryl portion of the arylalkyl group), having 7 to about 200 carbon atoms, such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms may optionally be present in either or both of the alkyl portion and the aryl portion of the alkylaryl group), having 7 to about 200 carbon atoms, such as tolyl or the like, Rh, Rk, and Rq each, independently of the others, is (i) a hydrogen atom, (ii) an alkyl group (including linear, branched, saturated, unsaturated, cyclic, acyclic, substituted, and unsubstituted alkyl groups, and wherein hetero atoms may optionally be present in the alkyl group), having 1 to about 200 carbon atoms, (iii) an aryl group (including unsubstituted and substituted aryl groups, and wherein hetero atoms may optionally be present in the aryl group), having 6 to about 200 carbon atoms, (iv) an arylalkyl group (including unsubstituted and substituted arylalkyl groups, wherein the alkyl portion of the arylalkyl group can be linear, branched, saturated, unsaturated, cyclic, and/or acyclic, and wherein hetero atoms may optionally be present in either or both of the alkyl portion and the aryl portion of the arylalkyl group), having 7 to about 200 carbon atoms such as benzyl or the like, or (v) an alkylaryl group (including unsubstituted and substituted alkylaryl groups, wherein the alkyl portion of the alkylaryl group can be linear, branched, saturated, unsaturated, cyclic, and/or acyclic, and wherein hetero atoms may optionally be present in either or both of the alkyl portion and the aryl portion of the alkylaryl group), having 7 to about 200 carbon atoms, such as tolyl or the like, those generated from branched diamino monoacid compounds, said branched triamides being of the formula wherein $R_1$, Ra, Rb, Rd, Re, Rg, and Rh are as defined hereinabove, those generated from branched monoamino diacid compounds, said branched triamides being of the formula wherein $R_2$, Ra, Rd, Rg, Rh, Rj, and Rk are as defined hereinabove, and the like, wherein the substituents on the substituted alkyl, alkylene, aryl, arylene, arylalkyl, arylalkylene, alkylaryl, and alkylarylene groups can be (but are not limited to) hydroxy groups, halogen atoms, imine groups, ammonium groups, cyano groups, pyridine groups, pyridinium groups, ether groups, aldehyde groups, ketone groups, ester groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, nitroso groups, sulfone groups, azide groups, azo groups, cyanato groups, carboxylate groups, mixtures thereof, and the like, wherein two or more substituents can be joined together to form a ring.

In one specific embodiment, when the triamide is of the formula the total number of carbon atoms in $R_1$+Ra+Rb+Rc+Rd+Re+Rf is 7 to no more than about 500. In another specific embodiment, each of Ra, Rd, Rb, Re, Rc, and Rf, independently of the others, has no more than about 50 carbon atoms, and in yet another specific embodiment no more than about 48 carbon atoms, although the number of carbon atoms can be outside of these ranges.

In one specific embodiment, when the triamide is of the formula the total number of carbon atoms in $R_2$+Rg+Rh+Rj+Rk+Rp+Rq is about 7 to no more than about 500. In another specific embodiment, each of Rg, Rh, Rj, Rk, Rp, and Rq, independently of the others, has no more than about 50 carbon atoms, and in yet another specific embodiment no more than about 48 carbon atoms, although the number of carbon atoms can be outside of these ranges.

In one specific embodiment, when the triamide is of the formula the total number of carbon atoms in $R_1$+Ra+Rb+Rd+Re+Rg+Rh is about 7 to no more than about 500. In another specific embodiment, each of Ra, Rd, Rb, Re, Rg, and Rh, independently of the others, has no more than about 50 carbon atoms, and in yet another specific embodiment no more than about 48 carbon atoms, although the number of carbon atoms can be outside of these ranges.

In one specific embodiment, when the triamide is of the formula the total number of carbon atoms in R₂+Ra+Rd+Rg+Rh+Rj+Rk is about 7 to no more than about 500. In another specific embodiment, each of Ra, Rd, Rg, Rh, Rj, and Rk, independently of the others, has no more than about 50 carbon atoms, and in yet another specific embodiment no more than about 48 carbon atoms, although the number of carbon atoms can be outside of these ranges.

It must be emphasized that not all of the amide groups in the first formula need to be directly bonded to the same atom in the $R_1$ or $R_2$ group, and in one specific embodiment, each amide group is bonded to a different atom in the $R_1$ or $R_2$ group.

In one specific embodiment, the branched triamide is of the formula wherein x, y, and z each, independently represent the number of propyleneoxy repeat units and x+y+z is from about 5 to about 6, and wherein p, q, and r each, independently of the others, are integers representing the number of repeat —(CH₂)— units and are from about 15 to about 60. The triamide composition is frequently obtained as a mixture of materials, wherein p, q, and r are each peak average chain length numbers within the composition, rather than uniform compositions wherein each molecule has the same value for p, q, and r, and it must be understood that within the mixture, some individual chains may be longer or shorter than the given numbers.

The triamide can be present in the ink in any desired or effective amount, such as from about 2 percent to about 50 percent by weight of the phase change ink carrier, or from about 5 percent to about 40 percent by weight of carrier, or from about 10 percent to about 35 percent by weight of the carrier.

Any suitable or desired wax can be selected for the phase change ink carrier herein. In embodiments, the wax is a polyethylene wax.

In embodiments, the polyethylene wax has an average peak molecular weight, as measured by high temperature gel permeation chromatography, of from about 350 to about 730.

In embodiments, the polyethylene wax has a polydispersity (determined by dividing weight average molecular weight by number average molecular weight) of at least about 1.0001 to no more than about 1.500.

In embodiments, the polyethylene wax has a peak melting point (as measured by differential scanning calorimetry (DSC)) of from about 50° C. to about 130° C.

In embodiments, the polyethylene wax has an onset melting point (as measured by differential scanning calorimetry (DSC)) of from about 50° C. to about 71° C.

In embodiments, the polyethylene wax has a melting range, which is defined as the difference between ending melting point and onset melting point as defined in ASTM D3418-03, of from about 5° C. to about 40° C.

In embodiments, the polyethylene wax has a freezing point (as measured by differential scanning calorimetry (DSC)) of from about 40° C. to about 80° C.

Fischer-Tropsch waxes can be prepared from the hydrogen and carbon monoxide mixture obtained by passing steam over hot coal. The synthesis can be carried out with metallic catalysts at high temperature and pressure. They are synthetic hydrocarbons, as opposed to natural hydrocarbons. They differ from polyethylene waxes, which are prepared by the polymerization of ethylene ($CH_2=CH_2$) in that polyethylene waxes tend to be completely linear, whereas Fischer-Tropsch waxes tend to have some degree of branching therein. Because of this branching, Fischer-Tropsch waxes tend to be somewhat less crystalline and somewhat less hard compared to the perfectly linear polyethylene waxes.

Fischer-Tropsch waxes included in the inks disclosed herein have an average peak molecular weight, as measured by high temperature gel permeation chromatography, of from about 300 to about 800.

The Fischer-Tropsch wax has a polydispersity (determined by dividing weight average molecular weight by number average molecular weight) of from about 1.001 to about 3.

The Fischer-Tropsch wax has a peak melting point (as measured by differential scanning calorimetry (DSC)) of from about 50° C. to about 105° C.

The Fischer-Tropsch wax has an onset melting point (as measured by differential scanning calorimetry (DSC)) of from about 40° C. to about 105° C.

The Fischer-Tropsch wax has a melting range, which is defined as the difference between ending melting point and onset melting point as defined in ASTM D3418-03, of from about 5° C. to about 40° C.

The Fischer-Tropsch wax has a freezing point (as measured by differential scanning calorimetry (DSC)) of from about 40° C. to about 90° C.

The polyethylene or Fischer-Tropsch wax in one specific embodiment has a viscosity at about 110° C. of from about 3 centipoise to about 10, or from about 4 centipoise to about 9 centipoise, or from about 4.5 centipoise to about 8 centipoise.

By "average peak molecular weight" is meant that the polyethylene or Fischer-Tropsch wax, while comprising a mixture of molecules of the formula —$(CH_2)_n$— wherein n is an integer representing the number of repeat —$CH_2$— units, has a distribution of molecules such that a plot of the relative amount of molecules versus the retention time or molecular weight would appear as a bell curve, wherein the peak of the bell curve represents the average peak molecular weight. In contrast, polyethylene or Fischer-Tropsch waxes having a different average peak molecular weight value, while they may contain materials that overlap in the value of "n", will have different characteristics.

In embodiments, the polyethylene wax in the inks disclosed herein have had some of the lowest molecular weight fraction removed therefrom and some of the highest molecular weight fraction removed therefrom, in one embodiment at least about the lowest 5 percent molecular weight fraction removed therefrom, in another embodiment at least about the lowest 7.5 percent molecular weight fraction removed therefrom, in yet another embodiment at least about the lowest 10 percent molecular weight fraction removed therefrom, in still another embodiment, at least about the lowest 12.5 molecular weight fraction removed therefrom, and in yet still another embodiment at least about the lowest 15 percent molecular weight fraction removed therefrom, and in one embodiment least about the highest 5 percent molecular weight fraction removed therefrom, in another embodiment at least about the highest 7.5 percent molecular weight fraction removed therefrom, in yet another embodiment at least about the highest 10 percent molecular weight fraction removed therefrom, in still another embodiment, at least about the highest 12.5 molecular weight fraction removed therefrom, and in yet still another embodiment at least about the highest 15 percent molecular weight fraction removed therefrom, although the amount removed therefrom can be outside of these ranges.

In some specific embodiments, the Fischer-Tropsch wax in the inks disclosed herein have had some of the lowest molecular weight fraction removed therefrom, in one embodiment at least about the lowest 5 percent molecular weight fraction removed therefrom, in another embodiment at least about the lowest 7.5 percent molecular weight fraction removed therefrom, in yet another embodiment at least about the lowest 10 percent molecular weight fraction removed therefrom, in still another embodiment, at least about the lowest 12.5 molecular weight fraction removed therefrom, in another embodiment at least about the lowest 15 percent molecular weight fraction removed therefrom, in yet another embodiment at least about the lowest 20 percent molecular weight fraction removed therefrom, in still another embodiment at least about the lowest 25 percent molecular weight fraction removed therefrom, in another embodiment at least about the lowest 30 percent molecular weight fraction removed therefrom, and in yet another embodiment at least about the lowest 35 percent molecular weight fraction removed therefrom, although the amount removed therefrom can be outside of these ranges.

The lowest molecular weight fraction and the highest molecular weight fraction can be removed from the polyethylene or Fischer-Tropsch wax by any desired or effective method, including (but not limited to) the distillation methods described in U.S. Patent Publication 2005/0130054, the disclosure of which is totally incorporated herein by reference and the purification methods set forth in U.S. Patent Publication 2006/0257495, the disclosure of which is totally incorporated herein by reference, or the like.

The polyethylene wax can be present in the ink in any desired or effective amount, such as from 10 percent to about 95 percent by weight of the phase change ink carrier, from about 15 percent to about 90 percent by weight of carrier, or from about 20 percent to about 85 percent by weight of the carrier.

The Fischer-Tropsch wax can be present in the ink in any desired or effective amount, such as from about 1 percent to about 99 percent by weight of the phase change ink carrier, or from about 3 percent to about 96 percent by weight of carrier, or from about 5 percent to about 95 percent by weight of the carrier.

Additional examples of suitable phase change ink carrier materials are monoamides, tetra-amides, mixtures thereof, and the like. Specific examples of suitable fatty amide ink carrier materials include stearyl stearamide, such as KEMAMIDE® S-180, available from Chemtura Corporation and the like. Further information on fatty amide carrier materials is disclosed in, for example, U.S. Pat. No. 4,889,560, U.S. Pat. No. 4,889,761, U.S. Pat. No. 5,194,638, U.S. Pat. No. 4,830,671, U.S. Pat. No. 6,174,937, U.S. Pat. No. 5,372,852, U.S. Pat. No. 5,597,856, and U.S. Pat. No. 6,174,937, the disclosures of each of which are totally incorporated herein by reference. In one specific embodiment, a monoamide is present in the ink carrier in an amount of from about 0.01 to about 90 percent by weight of the carrier, or from about 2 to about 80 percent by weight of the carrier, or from about 5 to about 70 percent by weight of the carrier.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. No. 5,750,604, U.S. Pat. No. 5,780,528, U.S. Pat. No. 5,782,966, U.S. Pat. No. 5,783,658, U.S. Pat. No. 5,827,918, U.S. Pat. No. 5,830,942, U.S. Pat. No. 5,919,839, U.S. Pat. No. 6,255,432, U.S. Pat. No. 6,309,453, the disclosures of each of which are totally incorporated herein by reference.

In embodiments, the phase change ink carrier comprises (a) stearyl stearamide, (b) triamide, or (c) mixtures thereof. In other embodiments, the phase change ink carrier comprises a mixture of one or more amides and one or more isocyanate-derived materials.

In one specific embodiment, the ink can contain a urethane resin obtained from the reaction of two equivalents of ABITOL® E hydroabietyl alcohol (available from Hercules Inc., Wilmington, Del.) and one equivalent of isophorone diisocyanate, prepared as described in Example 1 of U.S. Pat. No. 5,782,966, the disclosure of which is totally incorporated herein by reference. When present, this resin is present in the ink in one embodiment in an amount of at least about 1 percent to about 80 percent by weight of the ink carrier, or from about 2 percent to about 70 percent by weight of the ink carrier, or from about 3 percent to about 60 percent by weight of the ink carrier.

In another specific embodiment, the ink can contain a urethane resin that is the adduct of three equivalents of stearyl isocyanate and a glycerol-based alcohol prepared as described in Example 4 of U.S. Pat. No. 6,309,453, the disclosure of which is totally incorporated herein by reference. When present, this resin is present in the ink in an amount of from about 0.1 to about 40 percent by weight of the ink carrier, or from about 0.5 percent to about 35 percent by weight of the ink carrier, or from about 1 percent to about 30 percent by weight of the ink carrier.

The ink carrier is present in the phase change ink in any desired or effective amount, in embodiments at from about 0.1 percent to about 99 percent by weight of the ink, or from about 50 percent to about 98 percent by weight of the ink, or from about 50 percent to about 90 percent by weight based on the total weight of the ink.

The inks can also optionally contain an antioxidant. The optional antioxidants of the ink compositions protect the images from oxidation and also protect the ink components from oxidation during the heating portion of the ink preparation process. Specific examples of suitable antioxidants include NAUGUARD® 524, NAUGUARD® 76, NAUGUARD® 512, and Naugard® 445, aromatic amine antioxidant, available from Chemtura Corporation, IRGANOX® 1010 (commercially available from BASF—The Chemical Company), and the like. When present, the optional antioxidant is present in the ink in any desired or effective amount, such as from about 0.01 to about 20 percent by weight of the ink, or from about 0.05 to about 5 percent by weight of the ink, or from about 0.1 to about 3 percent by weight of the ink.

Other optional additives to the inks include clarifiers, such as UNION CAMP® X37-523-235 (commercially available from Union Camp), in any suitable or desired amount, such as from about 0.01 to about 98 percent by weight of the ink, tackifiers, such as FORAL® 85, a glycerol ester of hydrogenated abietic (rosin) acid (commercially available from Hercules), FORAL® 105, a pentaerythritol ester of hydroabietic (rosin) acid (commercially available from Hercules), CELLOLYN® 21, a hydroabietic (rosin) alcohol ester of phthalic acid (commercially available from Hercules), ARAKAWA KE-311 and KE-100 Resins, triglycerides of hydrogenated abietic (rosin) acid (commercially available from Arakawa Chemical Industries, Ltd.), synthetic polyterpene resins such as NEVTAC® 2300, NEVTAC® 100, and NEVTAC® 80 (commercially available from Neville Chemical Company), WINGTACK® 86, a modified synthetic polyterpene resin (commercially available from Goodyear), and the like, in any suitable or desired amount, such as from 0.1 percent to about 98 percent by weight of the ink, adhesives, such as VERSAMID® 757, 759, or 744 (commercially available from Henkel), in any suitable or desired amount, such as from about 0.1 to about 98 percent by weight of the ink, plasticizers, such as UNIPLEX® 250 (commercially available from Uniplex), the phthalate ester plasticizers commercially available from Monsanto under the trade name SANTICIZER®, such as dioctyl phthalate, diundecyl phthalate, alkylbenzyl phthalate (SANTICIZER® 278), triphenyl phosphate (commercially available from Monsanto), KP-140®, a tributoxyethyl phosphate (commercially available from FMC Corporation), MORFLEX® 150, a dicyclohexyl phthalate (commercially available from Morflex Chemical Company Inc.), trioctyl trimellitate (commercially available from Eastman Kodak Co.), and the like, in any suitable or desired amount, such as from about 0.1 percent to about 50 percent by weight of the ink.

Dispersant.

The white colorant can be dispersed using any desirable or effective dispersant. In embodiments, suitable dispersants include copolymers and block copolymers, in embodiments copolymers and block copolymers containing pigment affinic groups, such as amines, esters, alcohols and carboxylic acids. Illustrative examples of suitable dispersants include dispersants selected from Efka® 4008, Efka® 4009, Efka® 4047, Efka® 4520, Efka® 4010, Efka® 4015, Efka® 4020, Efka® 4050, Efka® 4055, Efka® 4080, Efka® 4300, Efka® 4330, Efka® 4400, Efka® 4401, Efka® 4403, Efka® 4406, Efka® 4800, all available from BASF—The Chemical Company, Disperbyk® 101, Disperbyk® 102, Disperbyk® 107, Disperbyk® 108, Disperbyk® 109, Disperbyk® 110, Disperbyk® 111, Disperbyk® 112, Disperbyk® 115, Disperbyk® 162, Disperbyk® 163, Disperbyk® 164, Disperbyk® 2001, all available from BYK Additives & Instruments, Wesel Germany, Solsperse® 21000, Solsperse® 24200, Solsperse® 24000 SC/GR, Solsperse® 26000, Solsperse® 32000, Solsperse® 36000, Solsperse® 39000, Solsperse® 41000, Solsperse® 71000 all available from Lubrizol Advanced Materials, Inc. Cleveland, Ohio or mixtures or combinations thereof. In embodiments, the dispersant comprises Disperbyk® 2001, a brand of industrial copolymer comprising a modified acrylate block copolymer. For example, in embodiments, typical properties for Disperbyk® 2001 include an amine value of about 29 milligrams KOH/gram, an acid value of about 19 milligrams KOH per gram, a density at 20° C. of about 1.03 grams per milliliter, about 46.0 percent non-volatile matter, a flash point of about 35° C., and solvent system comprising methoxypropylacetate/butylglycol/methoxypropanol in a 2/2/1 ratio. See Disperbyk® 2001 Data Sheet W224, 4 pages, available at http://www.byk-chemie.com, which is hereby incorporated by reference herein.

In embodiments, the dispersant can be a dispersant described in U.S. Pat. No. 7,973,186 of Adela Goredema, et al., which is hereby incorporated by reference herein in its entirety. In specific embodiments, the dispersant is a compound of the formula or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

The dispersant can optionally be a polymeric dispersant such as those sold under the name Solsperse®, in embodiments, Solsperse® 1700, Solsperse® 21000, Solsperse® 32000, Solsperse® 13240, available from The Lubrizol Corporation.

The dispersant can be provided in the phase change ink composition in any suitable or desired amount. In embodiments, the dispersant can be present in an amount of from about 1 to about 500 percent, or from about 10 to about 300 percent, or from about 30 to about 200 percent total dispersant, based on the total weight of the pigment in the phase change ink composition.

Synergist.

The phase change ink compositions herein can contain a synergist. Any suitable or desired synergist can be employed. Illustrative examples of suitable synergists include, but are not limited to, Solsperse® 22000 and Solsperse® 5000.

In embodiments, a copper phthalocyanine derivative is employed as a synergist for improving dispersion stability of the pigmented phase change inks.

The synergist can be provided in the phase change ink composition in any suitable or desired amount. In embodiments, the synergist can be present in an amount of from about 1 to about 300 percent, or from about 10 to about 200 percent, or from about 30 to about 150 percent total synergist, based on the total weight of the synergist in the phase change ink composition.

The ink compositions can be prepared by any desired or suitable method. For example, the ink ingredients can be mixed together, followed by heating, to a temperature of at least about 100° C. to no more than about 140° C., although the temperature can be outside of these ranges, and stiffing until a homogeneous ink composition is obtained, followed by cooling the ink to ambient temperature (typically from about 20 to about 25° C.). The inks are solid at ambient temperature. In a specific embodiment, during the formation process, the inks in their molten state are poured into molds and then allowed to cool and solidify to form ink sticks.

In embodiments, the process herein comprising subjecting the white colorant to acoustic mixing, in embodiments utilizing an acoustic mixer, capable of generating high intensity acoustic energy for mixing without impellers. In specific embodiments, the white colorant is subjected to acoustic mixing prior to being combined with the phase change ink carrier.

In embodiments, an acoustic mixer may include a closed vessel without impellers, which uses low-frequency, high intensity acoustic energy to provide the desired mixing of the white colorant.

Issues that may arise with the use of conventional mixers that possess impellers include, but are not limited to, a moderate mixing cycle; limited high-viscosity mixing capability; viscous heating; limited filler loading capability; high shear localized mixing; it requires contact mixing, and thus impeller cleaning is an additional step that must be utilized in the process; and the process includes mixing and transferring to a container, followed by shipping.

To the contrary, advantages to be found by using an acoustic mixer include, but are not limited to, fast mixing cycle; excellent high-viscosity mixing capability; low heat generation; high rate of filler loading; high intensity mixing throughout the volume of material to be mixed; non-contact, hygienic, sealed mixing; and a shorter process, as mixing may occur in the container possessing the material, which is then shipped.

The selected acoustic mixer in accordance with the present disclosure provides intimate mixing by applying a consistent shear field throughout the entire vessel, and thus may be especially suitable for the mixing of the white colorant herein.

In embodiments, a suitable acoustic mixer for use in accordance with the present disclosure include LABRAM mixers and RESONANTACOUSTIC® mixers, without impellers, commercially available from Resodyn™ Acoustic Mixers, Inc. (Butte, Mont.) The acoustic mixer is operated on a resonant frequency. A closely controlled electromechanical oscillator is used to excite the mix material. The acoustic mixer may operate at a frequency of from about 15 Hertz to about 2000 Hertz, in embodiments from about 30 Hertz to about 1000 Hertz. The entire system may oscillate in resonance, allowing highly efficient energy transfer and rapid mixing of the components of the polymer melt. In embodiments, the white colorant is subjected to acoustic mixing at an acceleration of from about 30 to about 110 g, wherein g is the acceleration of gravity and is defined as approximately 9.81 m$^2$/s.

Acoustic mixers, such as those available from Resodyn™ Acoustic Mixers, Inc., apply high intensity, low frequency acoustic energy such as to enable the shearing and extremely efficient mixing of materials in various physical states. In embodiments, optimum wetting of a pigment and the subsequent mixing with the supporting vehicle in an acoustic mixer is done at an acceleration of from about 30 to about 110 g's and an applied percentage intensity of from about 50 to about 100 percent intensity.

In embodiments, an acoustic mixer may handle polymer melts with a viscosity up to about 100 million centipoise (cP), in embodiments from about 1 million cP to about 80 million cP. Compared with an impeller-based mixer, an acoustic mixer can easily achieve good melt mixing within a very short time, in embodiments from about 1 minute to about 300 minutes, in other embodiments from about 2 minutes to about 60 minutes.

In certain embodiments, the white colorant, in embodiments, a titanium dioxide pigment, is treated with an acoustic mixer such as the Resodyn™ acoustic mixer from Resodyn™ Acoustic Mixers, Inc.

In embodiments, the white colorant herein is subjected to acoustic mixing, which can comprise subjecting the white colorant to acoustic mixing, adding a dispersant and further subjecting the white colorant and dispersant to further acoustic mixing, followed by adding a melt mixed phase change ink carrier composition to the acoustically mixed white colorant and optional dispersant. The phase change ink carrier composition can be pumped into a container containing the acoustically mixed white colorant at a controlled rate. An optional antioxidant, an optional synergist, and an optional fluorescent dye can be added to the phase change ink carrier with stirring. Optionally, the process can include filtering the phase change ink.

The wetting and milling of TiO$_2$ pigments in a heated attritor vessel using heated stainless steel shot and melted waxy vehicles such as those comprised with stearyl stearamide proceeded slowly with those formed concentrates having evidence of the TiO$_2$ pigment not having been thoroughly wetted and leading those concentrates to forming inferior inks that could not filter past a stainless steel mesh filter rated at 5 microns. In embodiments herein, when the same composition of TiO$_2$ and Solsperse® 21000 were acoustically mixed with 0.3 millimeter diameter YTZ® grinding beads, a very thick paste resulted and surprisingly was easily incorporated with other molten solid ink components resulting in low viscosity, Newtonian inks such as they could be filtered past a stainless steel mesh filter rated at 5 microns.

The final white colorant particles size and size distribution may be controlled by adjusting the amount of dispersant, and total residence time in the container subjected to acoustic mixing. In practice, a final particle size of from about 30 nanometers to about 500 nanometers can be achieved, in embodiments from about 80 nanometers to about 300 nanometers. In specific embodiments, the white colorant has a particle size of from about 200 to about 300 nanometers, and in a more specific embodiments, the white colorant is a titanium dioxide pigment having a particle size of from about 200 to about 300 nanometers.

In embodiments the container holding the white colorant alone or in combination with the phase change ink carrier components along with any additives, may be placed in an acoustic mixing device, mixed, and then shipped without ever removing the material from the container in which mixing occurred.

The inks can be employed in apparatus for direct printing ink jet processes and in indirect (offset) printing ink jet applications. Another embodiment disclosed herein is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195, 430, the disclosure of which is totally incorporated herein by reference. Yet another embodiment disclosed herein is directed to a process which comprises incorporating an ink as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. Inks as disclosed herein can also be employed in other hot melt printing processes, such as hot melt acoustic ink jet printing, hot melt thermal ink jet printing, hot melt continuous stream or deflection ink jet printing, and the like. Phase change inks as disclosed herein can also be used in printing processes other than hot melt ink jet printing processes.

In embodiments, a process herein comprises (1) incorporating into an ink jet printing apparatus a phase change ink composition comprising an acoustically treated white colorant; wherein the white colorant has been subjected to acoustic mixing at an acceleration of from about 30 to about 110 g, wherein the colorant dispersant has optionally been subjected to acoustic mixing at an acceleration of from about 30 to about 110 g; an optional synergist; an optional fluorescent dye; and a phase change ink carrier comprising (i) a branched triamide and (ii) a polyethylene wax, a Fischer Tropsch wax, or a mixture or combination thereof; (2) melting the ink; and (3) causing droplets of the melted ink to be ejected in an imagewise pattern onto a substrate.

In embodiments, a process herein includes wherein the optional fluorescent dye is present in the phase change ink; and wherein the melted ink is ejected in an imagewise pattern onto a colored substrate to form a printed image on the colored substrate wherein the printed image changes color from white to a different color when seen under ultraviolet light.

In further embodiments, a process herein includes wherein the optional fluorescent dye is present; wherein the melted ink is ejected in an imagewise fashion to form a white background on a substrate; and wherein a printed image is formed by depositing a colored ink onto the white background in an imagewise fashion wherein the background changes color from white to a different color when exposed to ultraviolet light.

In further embodiments, a process herein includes wherein the substrate is selected from the group consisting of dark substrates, black substrates, brown substrates, cardboard substrates, a Kraft paper substrates, and thick paper substrates.

The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, in another embodiment, of greater than about $10^5$ centipoise at a temperature of less than about 40° C., in another embodiment, of less than about 15 centipoise at a temperature of no less than about 70° C., although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like. In specific embodiments, the substrate comprises a dark substrate such as brown, black, and the like, such as brown or black Kraft paper. In other embodiments, the substrate comprises a cardboard or thick paper substrate. In embodiments, the substrate is selected from the group consisting of dark substrates, black substrates, brown substrates, cardboard substrates, Kraft paper substrates, and thick paper substrates.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

White pigmented solid ink containing 10% $TiO_2$ pigment.
10.0 parts (10.0 grams) of $TiO_2$ pigment was weighted in a 120 milliliter plastic bottle. The bottle was charged with 100 grams, 0.3 millimeter diameter zirconia beads (some room should be left in the bottle for the actual mill). The bottle was placed inside a Resodyn™ acoustic mixer, Resodyn™ Acoustic Mixers, Inc., and the $TiO_2$ pigments were allowed to be grinded by zirconia beads for 20 minutes at 80% Intensity. 6.0 parts (6.0 grams) of Solsperse® 21000 polymeric dispersant available from Lubrizol Corporation were added to the bottle (to the mixture of $TiO_2$ Pigment and Zirconia beads) after 30 minutes. The mixture of pigments and dispersant was grinded for 10 more minutes.

The final mixture—a thick white paste—was placed into a beaker and to this were slowly added, having already been melted and thoroughly mixed at 120° C., 49.7 parts (49.7 grams) of a distilled polyethylene wax having an average peak molecular weight of from about 350 to about 730 grams per mole, a polydispersity of from about 1.03 to about 3.0, and an asymmetrical molecular weight distribution skewed toward the high molecular weight end, obtained from Baker Petrolite and modified as described in U.S. Pat. No. 7,407,539, which is hereby incorporated by reference herein in its entirety), 12.3 parts (12.3 grams) Resin 6 (a triamide resin prepared as described in Example II of U.S. Pat. No. 6,860,930, which is hereby incorporated by reference herein in its entirety), 12.3 parts (12.3 grams) KEMAMIDE® S-180, stearyl stearamide available from Chemtura Corporation, 7.8 parts (7.8 grams) KE-100, triglycerides of hydrogenated abietic acid, available from Arakawa Chemical Industries, 0.9 parts (0.9 grams) urethane resin as prepared in Example 4 of U.S. Pat. No. 6,309,453, which is hereby incorporated by reference herein in its entirety, and 0.1 parts (0.1 grams) Naugard® 445, aromatic amine antioxidant available from Chemtura Corporation. The resultant ink was stirred for 2 hours at 120° C. The final ink was easily filtered through 5 um mesh in order to both isolate the beads and filter the ink.

Example 2

White pigmented solid ink containing 15% $TiO_2$ pigment.
15.0 parts (15.0 grams) of TiO2 pigment was weighted in a 120 milliliter plastic bottle. The bottle was charged with 100 grams, 0.3 millimeter diameter Zirconia beads (some room should be left in the bottle for the actual mill). The bottle was placed inside the Resodyn™ acoustic mixer and the $TiO_2$ pigments were allowed to be grinded by zirconia beads for 20 minutes at 80% Intensity. 9.0 parts (9.0 grams) of Solsperse®

21000 polymeric dispersant available from Lubrizol Corporation were added to the bottle (to the mixture of $TiO_2$ Pigment and Zirconia beads) after 20 minutes. The mixture of pigments and dispersant was grinded for 10 more minutes. The final mixture—a thick white paste—was placed into a beaker and to this were slowly added, having already been melted and thoroughly mixed at 120° C., 46.4 part (46.4 grams) of a distilled polyethylene wax as described in Example 1, 11.2 parts (11.2 grams) Resin 6, (a triamide resin prepared as described in Example II of U.S. Pat. No. 6,860,930) 11.2 parts (11.2 grams) KEMAMIDE® S-180, stearyl stearamide available from Chemtura Corporation, 6.2 parts (6.2 grams) KE-100, triglycerides of hydrogenated abietic acid, available from Arakawa Chemical Industries, 0.9 parts (0.9 grams) urethane resin as prepared in Example 4 of U.S. Pat. No. 6,309,453, which is hereby incorporated by reference herein in its entirety, and 0.1 parts (0.1 gram) Naugard® 445, aromatic amine antioxidant available from Chemtura Corporation. The resultant ink was stirred for 2 hours at 120° C. The final ink was easily filtered through 5 um mesh in order to both isolate the beads and filter the ink.

Example 3

Preparation of Pigmented White Concentrate. Into a 120 milliliter LLDPE (linear low density polyethylene) bottle were placed 100.0 grams of 0.3 millimeter diameter YTZ® grinding beads (grinding media produced from yttria-stabilized zirconia powder available from Tosoh Corporation) and 10.0 grams Ti-Pure® R-931 titanium dioxide from Dupont. The mixture was then placed in a Resodyn™ Acoustic Mixer from Resodyn™ Acoustic Mixers, Inc., and mixed at 90% intensity generating a force of 98 to 104 G's over the course of the 20 minutes it was mixed to form MIXTURE A. After the initial mixing step, 6.0 grams SOLSPERSE® 21000 was added to MIXTURE A and then placed in a Resodyn™ Acoustic Mixer and mixed at 90% intensity generating a force of 98 to 104 G's over the course of the 10 minutes it was mixed to form MIXTURE B. This example was repeated once more to allow a sufficient quantity of pigmented white concentrate to be made for subsequent handling steps herein.

Example 4

Preparation of Pigmented White Ink

Into a 600 milliliter beaker were placed 15.13 grams KEMAMIDE® S-180 (a stearyl stearamide commercially available from Chemtura Corporation), 15.13 grams of a triamide wax (triamide as described in Example II of U.S. Pat. No. 6,860,930), 61.34 grams of a distilled polyethylene wax (a polyethylene wax having an average peak molecular weight of from about 350 to about 730 grams per mole, a polydispersity of from about 1.03 to about 3.0, and an asymmetrical molecular weight distribution skewed toward the high molecular weight end, and modified as described in U.S. Pat. No. 7,407,539, from Baker Petrolite, 8.38 grams KE-100 resin commercially available from Arakawa Chemical Industries, 1.22 grams of a urethane resin that is the adduct of three equivalents of stearyl isocyanate and a glycerol-based alcohol (prepared as described in Example 4 of U.S. Pat. No. 6,309,453), 0.14 grams NAUGARD® 445 antioxidant commercially available from Chemtura Corporation. The mixture was transferred to an oven at 120° C. for 2 hours and then transferred and mixed on a hot plate set at 120° C. for 1 hour to form MIXTURE C. The two replicate preparations of MIXTURE B prepared in Example 1 were quantitatively transferred to a 600 milliliter beaker and then placed in an oven at 120° C. for 1 hour. The 600 milliliter beaker containing MIXTURE B was then transferred to a hot plate set to at 120° C. equipped with an overhead stirring apparatus and a multi-vaned impeller that was pre-heated to 120° C. in an oven. MIXTURE B was slowly stirred at first and then as it was being slowly diluted with MIXTURE C over the course of about 30 minutes, the stirring speed was increased to 350 RPM and allowed to stir at that speed for an additional 2 hours. The newly formed pigmented white ink was isolated from the YTZ® grinding media by filtering it through a 165× 800 304 SS mesh (having a 25 micron rating), available from McMaster-Carr, at 120° C. using a KST-47 filtration apparatus available from Advantec Corporation.

Example 5

Preparation of Pigmented White Ink Containing a Fluorescent Compound. The pigmented white ink from Example 4, MIXTURE C, was placed back on a hot plate set at 120° C. equipped with an overhead stirring apparatus and a multi-vaned impeller, that was pre-heated to 120° C. in an oven, such that the stirring speed was 300 RPM. To stirring MIXTURE C were slowly added 0.74 g DFKY-C7 clear red fluorescent dye commercially available from Risk Reactor. The ink was allowed to stir for 2 hours and then filtered through a 165×800 304 SS mesh (having a 25 micron rating), available from McMaster-Carr, at 120° C. using a KST-47 filtration apparatus available from Advantec Corporation.

Ink Characterization Results.

Rheology.

The rheology of Example 2 was determined at 110° C. using a 50 millimeter cone and plate geometry on a RFS-III rheometer, available from Rheometrics. The dynamic viscosities at 2 different shear rates (the shear rate sweep was increased from 1 to 100 ($s^{-1}$) in both High To Low and Low To High modes were measured. An appropriate target viscosity of the ink is approximately 10 centipoise at 110° C.

The rheology results indicated that the white solid ink displays Newtonian behavior as can be seen in Table 1.

TABLE 1

| Example Number | Viscosity @ 0.1 Hz (cP) | Viscosity @ 10 Hz (cP) | Viscosity @ 1 $s^{-1}$ (cP) | Viscosity @ 100 $s^{-1}$ (cP) |
|---|---|---|---|---|
| 2 | 12.1 | 11.3 | 12.7 | 12.4 |

Print Demonstration.

Figure 1:
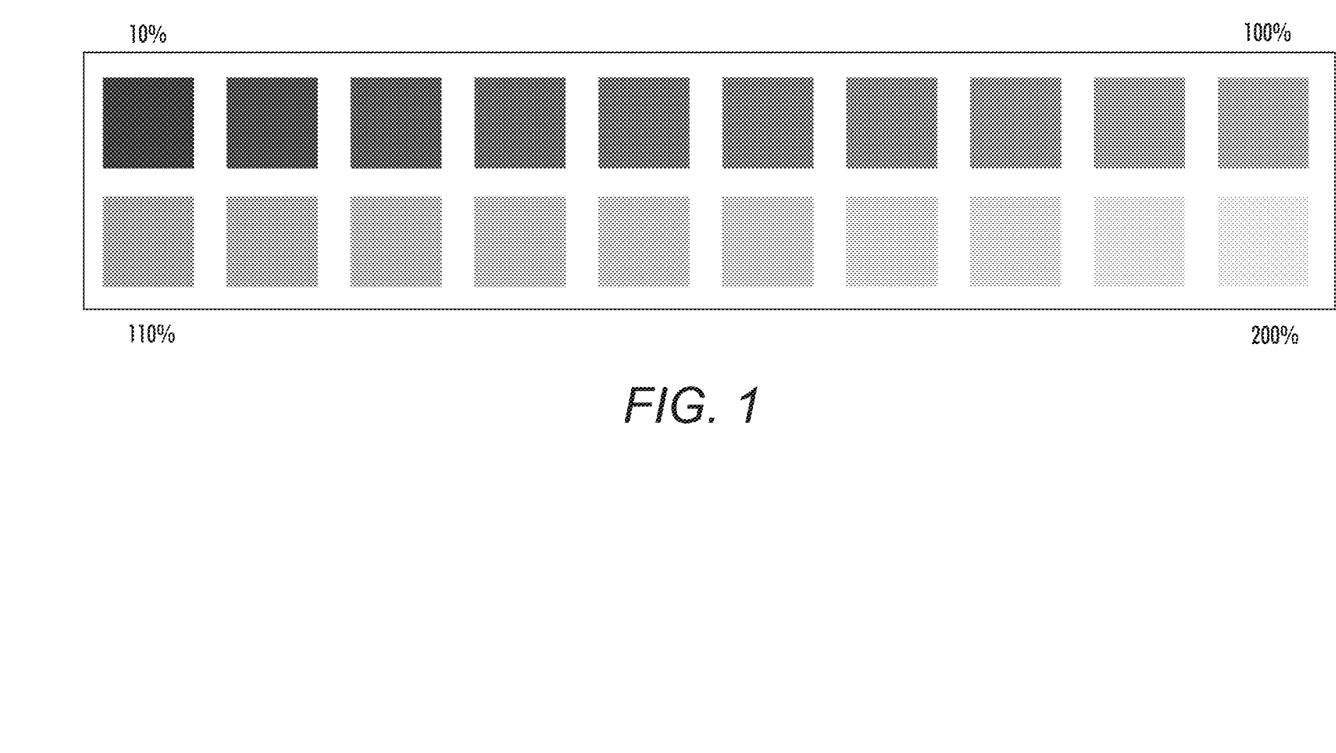
FIG. 1 is a print showing white prints on black paper over a range of ink coverage.

An ink sample of ink Example 2 was printed on a Xerox® Phaser® 8860 printer. A target was chosen such that different area coverages with differing densities were printed. One of the printed images show area coverages of the ink from 10% to 200% (incremental in steps of 10% area coverage) at 525× 450 dpi resolution. The test prints were made on different paper substrates like the black and brown Kraft paper. Of particular interest are prints made on black substrate. Black substrate defines the worst scenario case for white ink. Any ambient light passing through a white layer with poor hiding power will be absorbed by the black background underneath, resulting in a poor white appearance. FIG. 1 shows white prints on black paper in a range of coverage from 10% to 200%. The contrast between white and black areas is quite impressive, particularly for the 200% coverage situation. 100% is regular printing. 200% represent a two layer print.

In addition to the excellent visual appearance, the quality of the white ink prints on black paper was characterized by reflection spectroscopy over the standard visible range of the light spectrum (380 nanometers to 730 nanometers). This was carried out with a GretagMacbeth Spectrolino spectrophotometer.

Figure 2:
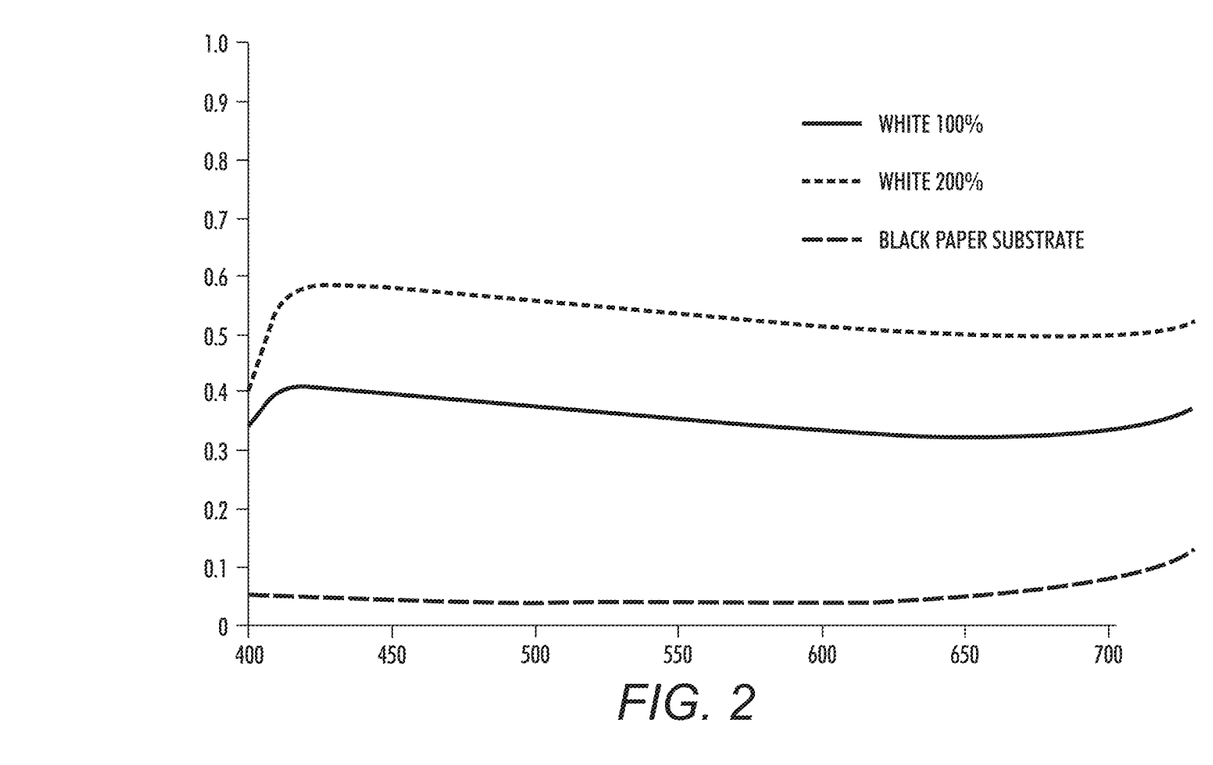
FIG. 2 is a graph showing reflectance (y-axis) versus wavelength (x-axis, nanometers) for a white ink of the present disclosure at 100% and 200% coverage and for a black paper substrate.

FIG. 2 shows the reflection spectra of the white ink of Example 2 (200% and 100%) and of the black paper substrate alone, for comparison.

It can be seen that a reflection of about 40% is achieved with regular printing conditions (100%, 1 layer). The white quality is further improved by printing two layers (200% coverage) to about 60% reflection. Over black substrate this is quite good hiding power. The averaged Optical Density for 200% coverage over the entire Visible spectrum was OD=0.28. As a result, the white shows excellent hiding power.

For comparison, the best possible white which could ever be achieved is white paper. Xerox® 4200 white paper showed an averaged Optical Density of OD=0.07. A value of 0.28 measured for 200% coverage over black paper substrate is quite impressive and is expected to provide sufficient contrast of printed white ink over the black paper substrate. The ink may be usable for printing text or codes like 2D and Bar codes on colored substrates, particularly over black or very dark substrates.

One particular aspect related to the white quality is the fact that the reflection is about constant over the whole visible range of the spectrum. This means that the printed ink scatters incident light at all wavelengths. This defines a very close to pure white, which is of course desired.

Thus, in embodiments, a white solid ink composition suitable for printing on colored substrates is provided. In embodiments, the ink is prepared by adding a white pigment to a solid ink base composition. In embodiments, the ink composition contains (a) titanium dioxide white pigment (b) an ink base (c) a dispersant and (d) an optional synergist. Certain inks having from about 12 to about 17% titanium dioxide were printed digitally and showed good hiding power (opacity). For example, up to 60% reflection was measured on a test patch printed with a white solid ink as described herein on black paper. TEM (transmission electron microscopy) and SEM (scanning electron microscopy) analysis were done. In embodiments, TEM shows primary $TiO_2$ particles are on the order of from about 150 to about 200 nanometers. SEM analysis reveals that the $TiO_2$ is dispersed very well and uniformly throughout the sample analyzed. Therefore, a jettable white solid ink with high enough pigment loading to allow good hiding power on a colored substrate is provided. The white solid ink herein provides broad applicability in labeling and packaging markets.

A shear viscosity profile of Example 5 ink was determined at 110° C. using a 50 millimeter cone and plate geometry on a RFS-III rheometer, obtained from Rheometrics Corporation, now TA Instruments. The shear viscosities at 1 and 100 $s^{-1}$ were determined from the shear rate sweep extending from 1 to approximately 251.2 $s^{-1}$. An appropriate target viscosity range of the ink is approximately 8 to approximately 12 centipoise and better Newtonian behavior is realized when the difference of the viscosities at each of these comparative shear rates, such as 1 and 100 $s^{-1}$ are minimized, such as less than 1 centipoise, such as less than 0.5 centipoise or zero. A summary of the viscosity results of the Example 5 ink are given below in Table 2.

TABLE 2

| Attribute | Value |
|---|---|
| Shear viscosity at 1 $s^{-1}$ | 11.53 |
| Shear viscosity at 10 $s^{-1}$ | 11.42 |
| Shear viscosity at 100 $s^{-1}$ | 11.41 |
| Viscosity Shear Rate Index, $(\eta_{1\,s^{-1}}/\eta_{100\,s^{-1}})$ | 1.01 |

The data from Table 2 indicate that the Example 5 ink has a very good Newtonian quality given by its Viscosity Shear Rate Index, it being very near to 1 (a value of exactly 1 being considered a Newtonian fluid) and has an overall shear viscosity consistent with the general requirements of typical Piezo Ink Jet (PIJ) inks.

The ink sample from Example 5 was printed on a Xerox® Phaser® 8860 printer. A target was chosen such that different area coverage's with differing densities were printed. One of the printed images show area coverage's of the ink from 10% to 200% (incremental in steps of 10% area coverage) at 525× 450 dpi resolution. The test prints were made on different paper substrates like the black and brown Kraft paper. Of particular interest are prints made on black substrate. Black substrate defines the worst scenario case for white ink. Any ambient light passing through a white layer with poor hiding power will be absorbed by the black background underneath, resulting in a poor white appearance.

When viewed under normal conditions the printed inks appear white on both brown and black paper. Good contrast between the background color of the paper substrate and the printed areas is seen for both types of substrates (brown and black). As such under normal conditions the ink performs in an acceptable fashion for white solid ink.

Prophetic Example 6

Preparation of Pigmented White Concentrate. Into a 120 milliliter LLDPE bottle are placed 100.0 grams of 0.3 millimeter diameter YTZ® grinding beads (grinding media produced from yttria-stabilized zirconia powder available from Tosoh Corporation) and 10.0 grams Ti-Pure® R-931 titanium dioxide from Dupont. The mixture is then placed in a Resodyn™ Acoustic Mixer from Resodyn™ Acoustic Mixers, Inc., and mixed at 90% intensity generating a force of about 100 G's over the course of the 20 minutes it is mixed to form MIXTURE A. After the initial mixing step, 6.0 grams SOLSPERSE® 21000 is added to MIXTURE A and then placed in a Resodyn™ Acoustic Mixer from Resodyn™ Acoustic Mixers, Inc., and mixed at 90% intensity generating a force of about 100 G's over the course of the 10 minutes it is mixed to form MIXTURE B. This example is repeated three times to allow a sufficient quantity of pigmented white concentrate to be made for subsequent handling steps herein.

Prophetic Example 7

Preparation of Pigmented White Ink Containing About 25 Weight Percent $TiO_2$. Into a 600 milliliter beaker are placed 14.34 grams KEMAMIDE® S-180 (a stearyl stearamide commercially available from Chemtura Corporation), 14.34 grams of a triamide wax (triamide as described in Example II of U.S. Pat. No. 6,860,930), 58.11 grams of a distilled polyethylene wax (a polyethylene wax having an average peak molecular weight of from about 350 to about 730 grams per mole, a polydispersity of from about 1.03 to about 3.0, and an asymmetrical molecular weight distribution skewed toward the high molecular weight end, and modified as described in U.S. Pat. No. 7,407,539, from Baker Petrolite, 7.94 grams KE-100 resin commercially available from Arakawa Chemical Industries, 1.15 grams of a urethane resin that is the adduct of three equivalents of stearyl isocyanate and a glycerol-based alcohol (prepared as described in Example 4 of U.S. Pat. No. 6,309,453), 0.13 grams NAUGARD® 445 antioxidant commercially available from Chemtura Corporation. The mixture is transferred to an oven at 120° C. for 2 hours and then transferred and mixed on a hot plate set at 120° C. for 1 hour to form MIXTURE C. The four replicate preparations of MIXTURE B prepared in Prophetic Example 6 are quantitatively transferred to a 600 milliliter beaker and then placed in an oven at 120° C. for 1 hour. The 600 milliliter beaker containing MIXTURE B is then transferred to a hot plate set to at 120° C. equipped with an overhead stirring apparatus and a multi-vaned impeller that is pre-heated to 120° C. in an oven. MIXTURE B is slowly stirred at first and then as it was being slowly diluted with MIXTURE C over the course of about 30 minutes, the stirring speed is increased to 350 RPM and allowed to stir at that speed for an additional 2 hours. The newly formed pigmented white ink is isolated from the YTZ® grinding media by filtering it through a 165×800 304 SS mesh (having a 25 micron rating), available from McMaster-Carr, at 120° C. using a KST-47 filtration apparatus available from Advantec Corporation.

The present ink provides an advantage in that when the samples are seen under ultraviolet light (for example, with a black light, 365 nanometers wavelength), the previously white areas show bright red light emission under the ultraviolet light. This is a unique property of the present security white solid ink, not seen with previously disclosed white solid ink which appears still whitish-bluish under ultraviolet light (no significant color change). This characteristic provides a key security feature which is hard to reproduce by someone else. Further, the red coloring switching capability provided by the fluorescent materials cannot be copied.

In embodiments, the white ink can be used as a security ink which is printed on a dark substrate. Prints made with this ink appear white under normal light like any other ink. However under UV light, the prints appear red. If a barcode, for example, is printed with this ink, then it will demonstrate product authenticity if it the barcode is able to change color from white (normal visible light) to red (under ultraviolet light).

In another embodiment, a white background area can be printed over a substrate, in embodiments, over a dark colored substrate. Information of interest, for example, for label or packaging applications, can then be printed with regular colored ink in the same way as it would be printed on white paper. In this embodiment the printed document or package will show a white background under normal light. Under ultraviolet light, the printed document or package will emit a different color (such as red). The information is perfectly readable also under ultraviolet as a contrast between the bright red light of the background and the permanent color of the regular dark ink used for printing. Coloration of the white background to a selected color (for example, red) would indicate an authentic product or packaging. Lack of color change indicates a fake. In embodiments, the background can be digitally printing or depositing using a coating process including known coating processes such as spin coating, blade coating, rod coating, dip coating, and the like, although not limited.

In certain embodiments, the phase change ink compositions herein further comprise an additional component to enhance the security feature of the ink. In embodiments, the phase change ink compositions herein include an additional component which renders the ink more secure and unique as compared to other solid ink security inks available to date. The phase change ink compositions herein can be used in various printing and packaging applications. The phase change ink compositions herein can be used as security inks which enable novel uses of said inks including, but not limited to, use in the transactional and promotional sector and in packaging. Digitally printed customized discount checks and coupons are key components of transactional and promotional documents. Given that worldwide losses due to counterfeiting are believed to have hit the record value of over $600 billion every year, and further that it is believed that one third of all promotional coupons in the U.S. are believed to be counterfeited, the need for protection is unquestionable. The security printing market in the packaging industry alone is estimated to reach $85 Billion by 2015 with a compound annual growth rate of 8% (2010-2015).

In embodiments, a novel solid ink composition for security printing applications is provided. The phase change ink composition comprises a solid ink base, a white pigment which provides a white appearance when printed, and a fluorescent dye. The performance of the phase change ink composition is unique because it has dual security features: a white appearance under normal viewing conditions and a colored appearance when viewed with ultraviolet (UV) light sources such as black light typically found in stores for authenticating currency bills. The phase change ink provides a uniqueness which is a key requirement which renders an ink more difficult to counterfeit. The present inventors have demonstrated inks emitting various colors, i.e. white changing to red under UV light. Printability of these unique ink compositions was also demonstrated.

The phase change inks can be used for various applications as noted hereinabove including for applications such as transactional and promotional applications and secure packaging printing.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A process for preparing a phase change ink comprising:
   (a) subjecting a white colorant to acoustic mixing at an acceleration of from about 30 to about 110 g;
   (b) optionally, adding a dispersant and subjecting the white colorant and dispersant to further acoustic mixing at an acceleration of from about 30 to about 110 g;
   (c) separately melt mixing an optional antioxidant, an optional synergist, and a phase change ink carrier comprising (i) a branched triamide and (ii) a polyethylene wax, a Fischer Tropsch wax, or a mixture or combination thereof, to form a melt mixture;
   (d) adding the melt mixture of (c) to the acoustically mixed white colorant of (a) or (b) with stirring;
   (e) optionally, adding a fluorescent dye with stifling; and
   (d) optionally, filtering the phase change ink.

2. The process of claim 1, wherein the white colorant is a white pigment selected from titanium dioxide pigment, rutile, zinc oxide pigment, zinc sulfide pigment, calcium carbonate pigment, clay, lithopone or mixtures or combinations thereof.

3. The process of claim 1, wherein the white colorant is a titanium dioxide pigment having a particle size of from about 200 to about 300 nanometers; and wherein the white colorant is present in the ink in an amount of from about 1 to about 60 percent by weight based upon the total weight of the ink.

4. The process of claim 1, wherein the acoustic mixing of step (a), (b), or a combination thereof, is carried out in the presence of grinding media; and wherein the grinding media is selected from the group consisting of stainless steel shot, spherical ceramic media, cylindrical ceramic media, spherical glass beads, and a combination thereof.

5. The process of claim 1, wherein the fluorescent dye is selected from the group consisting of rhodamines, fluorescein, coumarins, napthalimides, benzoxanthenes, acridines, azos; rare earth metallic coordination complexes; and mixtures and combinations thereof.

6. A phase change ink comprising:

an acoustically treated white colorant; wherein the white colorant has been subjected to acoustic mixing at an acceleration of from about 30 to about 110 g;

a colorant dispersant, wherein the colorant dispersant has optionally been subjected to acoustic mixing at an acceleration of from about 30 to about 110 g;

an optional synergist;

an optional fluorescent dye; and a phase change ink carrier comprising (i) a branched triamide and (ii) a polyethylene wax, a Fischer Tropsch wax, or a mixture or combination thereof.

7. The phase change ink of claim 6, wherein the white colorant is a white pigment selected from titanium dioxide pigment, rutile, zinc oxide pigment, zinc sulfide pigment, calcium carbonate pigment, clay, lithopone or mixtures or combinations thereof.

8. The phase change ink of claim 6, wherein the white colorant is a titanium dioxide pigment having a particle size of from about 200 to about 300 nanometers; and wherein the white colorant is present in the ink in an amount of from about 1 to about 60 percent by weight based upon the total weight of the ink.

9. The phase change ink of claim 6, wherein the dispersant is selected from copolymers and block copolymers containing pigment affinic groups, or mixtures or combinations thereof; or wherein the dispersant a compound of the formula or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

10. The phase change ink of claim 6, wherein the phase change ink carrier is present in an amount of from about 0.1 percent to about 99 percent by weight based on the total weight of the ink.

11. The phase change ink of claim 6, wherein the branched triamide is a compound of the formula wherein x, y, and z each independently represent the number of propyleneoxy repeat units and x+y+z is from about 5 to about 6, and wherein p, q, and r each, independently of the others, are integers representing the number of repeat —($CH_2$)— units and are from about 15 to about 60.

12. The phase change ink of claim 6, wherein the phase change ink carrier further comprises:

a mixture of one or more amides and one or more isocyanate-derived materials.

13. The phase change ink of claim 6, wherein the fluorescent dye is selected from the group consisting of rhodamines, fluorescein, coumarins, napthalimides, benzoxanthenes, acridines, azos; rare earth metallic coordination complexes; and mixtures and combinations thereof.

14. A process comprising:

(1) incorporating into an ink jet printing apparatus a phase change ink composition comprising an acoustically treated white colorant; wherein the white colorant has been subjected to acoustic mixing at an acceleration of from about 30 to about 110 g; a colorant dispersant, wherein the colorant dispersant has optionally been subjected to acoustic mixing at an acceleration of from about 30 to about 110 g; an optional synergist; an optional fluorescent dye; and a phase change ink carrier comprising (i) a branched triamide and (ii) a polyethylene wax, a Fischer Tropsch wax, or a mixture or combination thereof;

(2) melting the ink; and (3) causing droplets of the melted ink to be ejected in an imagewise pattern onto a substrate.

15. The process of claim 14, wherein the optional fluorescent dye is present; and wherein the melted ink is ejected in an imagewise pattern onto a colored substrate to form a printed image on the colored substrate wherein the printed image changes color from white to a different color when seen under ultraviolet light.

16. The process of claim 14, wherein the optional fluorescent dye is present;

wherein the melted ink is ejected in an imagewise fashion to form a white background on a substrate;

wherein a printed image is formed by depositing a colored ink onto the white background in an imagewise fashion wherein the background changes color from white to a different color when exposed to ultraviolet light.

17. The process of claim 14, wherein the substrate is selected from the group consisting of dark substrates, black substrates, brown substrates, cardboard substrates, a Kraft paper substrates, and thick paper substrates.

18. A coated substrate comprising:

a substrate and a phase change ink composition deposited thereover;

wherein the phase change ink composition comprises an acoustically treated white colorant; wherein the white colorant has been subjected to acoustic mixing at an acceleration of from about 30 to about 110 g; a colorant dispersant, wherein the colorant dispersant has optionally been subjected to acoustic mixing at an acceleration of from about 30 to about 110 g; an optional synergist; a fluorescent dye; and a phase change ink carrier comprising (i) a branched triamide and (ii) a polyethylene wax, a Fischer Tropsch wax, or a mixture or combination thereof.

19. An ink jet printer stick or pellet containing a phase change ink composition comprising an acoustically treated white colorant; wherein the white colorant has been subjected to acoustic mixing at an acceleration of from about 30 to about 110 g; a colorant dispersant, wherein the colorant dispersant has optionally been subjected to acoustic mixing at an acceleration of from about 30 to about 110 g; an optional synergist; an optional fluorescent dye; and a phase change ink carrier comprising (i) a branched triamide and (ii) a polyethylene wax, a Fischer Tropsch wax, or a mixture or combination thereof.

20. A security enabled phase change ink composition comprising:
   an invisible fluorescent dye;
   an acoustically treated white colorant; wherein the white colorant has been subjected to acoustic mixing at an acceleration of from about 30 to about 110 g;
   an optional dispersant;
   an optional synergist; and
   a phase change ink carrier comprising (i) a branched triamide and (ii) a polyethylene wax, a Fischer Tropsch wax, or a mixture or combination thereof;
   wherein a printed image prepared with the phase change ink composition appears white under normal ambient conditions and wherein the printed image changes color when subjected to ultraviolet light.

* * * * *